United States Patent
De Hernandez et al.

(10) Patent No.: US 10,190,055 B2
(45) Date of Patent: Jan. 29, 2019

(54) REVERSE EMULSION BREAKER COPOLYMERS

(71) Applicant: Ecolab USA Inc., St. Paul, MN (US)

(72) Inventors: Vittoria Balsamo De Hernandez, Fulshear, TX (US); Jenny L. Phan, Tomball, TX (US); Pious Kurian, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 135 days.

(21) Appl. No.: 15/184,240

(22) Filed: Jun. 16, 2016

(65) Prior Publication Data
US 2016/0369170 A1   Dec. 22, 2016
US 2017/0240815 A9   Aug. 24, 2017

Related U.S. Application Data

(60) Provisional application No. 62/181,647, filed on Jun. 18, 2015.

(51) Int. Cl.
*C02F 1/68* (2006.01)
*C10C 3/08* (2006.01)
(Continued)

(52) U.S. Cl.
CPC ............ *C10C 3/08* (2013.01); *B01D 17/0214* (2013.01); *B01D 17/047* (2013.01); *C02F 1/68* (2013.01); *C08F 2/32* (2013.01); *C08F 220/54* (2013.01); *C08F 220/56* (2013.01); *C10G 33/04* (2013.01); *C08F 2800/10* (2013.01)

(58) Field of Classification Search
CPC ..... C02F 1/68; B01D 17/047; B01D 17/0214; C08F 220/54; C08F 2/32; C08F 2800/10; C08F 220/56; C10G 33/04; C10C 3/08

USPC ............... 516/169, 170, 171, 172; 210/708; 208/188
See application file for complete search history.

(56) References Cited

U.S. PATENT DOCUMENTS 3,478,003 A * 11/1969 McClendon .............. C08F 8/00
                                                             525/328.4
3,691,086 A *  9/1972 Lees .................... B01D 17/047
                                                             210/726

(Continued)

FOREIGN PATENT DOCUMENTS

CN      101161691 A      4/2008
CN      103788289 A      5/2014
(Continued)

OTHER PUBLICATIONS

International Search Report dated Sep. 11, 2016 relating to PCT Application No. PCT/US2016/037871, 6 pages.

*Primary Examiner* — Daniel S Metzmaier
(74) *Attorney, Agent, or Firm* — Stinson Leonard Street LLP (57) ABSTRACT

The present invention generally relates to methods for resolving water and oil emulsions in the produced fluid of an oil production system comprising adding a structured copolymer reverse emulsion breaker to the produced fluid of the crude oil production system in an amount effective for resolving an oil-in-water emulsion. In particular, these methods for resolving an oil-in-water emulsion can be used in separation processes where the oil and solids in the produced fluid are separated from the produced water in the produced fluid.

20 Claims, 4 Drawing Sheets

(51) Int. Cl.
  *B01D 17/02* (2006.01)
  *B01D 17/04* (2006.01)
  *C08F 2/32* (2006.01)
  *C10G 33/04* (2006.01)
  *C08F 220/54* (2006.01)
  *C08F 220/56* (2006.01)

(56) References Cited

U.S. PATENT DOCUMENTS

| | | | |
|---|---|---|---|
| 4,026,794 A * | 5/1977 | Mauceri | B01D 17/047 |
| | | | 210/708 |
| 4,179,549 A * | 12/1979 | Buriks | B01D 17/047 |
| | | | 210/734 |
| 4,343,730 A * | 8/1982 | Becker | B03D 1/016 |
| | | | 210/734 |
| 4,395,524 A * | 7/1983 | Emmons | C08F 220/54 |
| | | | 524/555 |
| 4,734,205 A * | 3/1988 | Jacques | C02F 1/54 |
| | | | 210/708 |
| 4,741,835 A | 5/1988 | Jacques et al. | |
| 4,931,191 A | 6/1990 | Braden et al. | |
| 4,940,763 A * | 7/1990 | Flesher | C02F 1/54 |
| | | | 526/292.2 |
| 4,981,936 A | 1/1991 | Good, Jr. et al. | |
| 5,028,239 A | 7/1991 | Stephenson | |
| 5,051,487 A * | 9/1991 | Bhattacharyya | C02F 1/54 |
| | | | 526/287 |
| 5,068,297 A * | 11/1991 | Bhattacharyya | C02F 1/54 |
| | | | 526/287 |
| 5,921,912 A | 7/1999 | Hart et al. | |
| 6,369,182 B1 | 4/2002 | Whipple et al. | |
| 7,645,725 B2 | 1/2010 | Weaver et al. | |
| 7,994,112 B2 | 8/2011 | Vanpachtenbeke et al. | |
| 8,530,597 B2 | 9/2013 | Kurian et al. | |
| 9,260,545 B1 | 2/2016 | Squicciarini | |
| 9,434,803 B2 * | 9/2016 | Squicciarini | C08F 220/54 |
| 2006/0237372 A1 | 10/2006 | Arciszewski et al. | |
| 2011/0147306 A1 | 6/2011 | Polizzotti et al. | |
| 2011/0253599 A1 | 10/2011 | Cross et al. | |
| 2012/0130037 A1 | 5/2012 | Querci et al. | |
| 2012/0171301 A1 | 7/2012 | Koenig et al. | |
| 2015/0053622 A1 | 2/2015 | Zhang et al. | |

FOREIGN PATENT DOCUMENTS

| | | |
|---|---|---|
| EP | 0 377 313 A2 | 7/1990 |
| WO | 2010/107554 A2 | 9/2010 |

* cited by examiner

REVERSE EMULSION BREAKER COPOLYMERS

CROSS-REFERENCE TO RELATED APPLICATION

This application is related to the International Application Serial No. PCT/US2016/037871 filed Jun. 16, 2016, published on Dec. 22, 2016 as Publication No. WO 2016/205513, and claims priority to U.S. Provisional Patent Application Ser. No. 62/181,647, filed Jun. 18, 2015, the contents of which are incorporated by reference herein.

FIELD OF THE INVENTION

The present invention generally relates to methods for resolving water and oil emulsions as the produced fluids of an oil production system comprising adding a reverse emulsion breaker to a produced fluid of the crude oil production system in an amount effective for resolving an oil-in-water or water-in-oil-in-water emulsion. In particular, these methods for resolving the emulsions can be used in separation processes where the oil and solids in the produced fluid are separated from the produced water in the produced fluid.

BACKGROUND OF THE INVENTION

Oil-in-water and water-in-oil-in-water emulsions can occur in many industrial systems. For example, these emulsions are a problem in many energy extraction systems because the produced fluids contain oil and solids dispersed in the produced water and separation of the oil and solids from the water is needed to comply with the oil sales specifications and to provide acceptable specifications before the water can be disposed or re-used.

In particular, oil-in-water and water-in-oil-in-water emulsions can be problems in produced fluid (steam assisted gravity drainage (SAGD), steam flood, etc.) separation processes where the oil and solids in the produced fluid are separated from the produced water in the produced fluid.

For example, SAGD operations inject steam into geological formations to stimulate the production of bitumen or heavy hydrocarbon. Oil sands deposits in Alberta, Canada, represent an area where this process is extensively used. Pairs of horizontal wells are bored into the oil-containing formation. The upper well injects steam and the lower well, which is positioned below the steam injection line, continuously extracts a complex emulsion. That emulsion contains bitumen and water. The emulsion is broken; the bitumen is sent for upgrading/refining, while the produced water (separated from the emulsion) is treated and reused as feedwater for the steam generators.

SUMMARY OF THE INVENTION

One aspect of the invention is a method of resolving a reverse emulsion in produced fluid of an oil production system comprising adding a reverse emulsion breaker to a produced fluid of the oil production system in an amount effective for resolving the reverse emulsion, the reverse emulsion breaker comprising a structured copolymer derived from the monomers of Formulae 1, 2, and 3:

Formula 1

Formula 2

Formula 3 wherein $R_1$, $R_2$, and $R_3$ are independently hydrogen or alkyl; $R_4$, $R_5$, $R_6$, $R_7$, and $R_8$ are independently alkyl; A is independently —NH— or O—; p and q are independently an integer from 1 to 6; and wherein the weight average molecular weight of the structured copolymer is from about 20,000 to about 2,000,000 Daltons.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

The present invention is directed to methods for the improved separation of water and oil in oil production and processing operations. The method of the present invention comprises treating a system containing oil and water, where emulsions form, with a structured copolymer solution. The structured copolymer containing treatments of the present invention were found to be effective treatments for resolving (e.g., breaking or inhibiting) oil-in-water (i.e., reverse) and water-in-oil-in-water (i.e., complex) emulsions in petroleum processes. Particularly, these reverse emulsion breakers are effective for improving the water quality in steam-assisted gravity drainage (SAGD) processes. The reverse emulsion breakers disclosed herein are also typically water-soluble.

One aspect of the invention is a method of resolving a reverse emulsion in produced fluid of an oil production system comprising adding a reverse emulsion breaker to a produced fluid of the oil production system in an amount effective for resolving the reverse emulsion, the reverse emulsion breaker comprising a structured copolymer derived from the monomers of Formulae 1, 2, and 3:

Formula 1

Formula 2

Formula 3 wherein $R_1$, $R_2$, and $R_3$ are independently hydrogen or alkyl; $R_4$, $R_5$, $R_6$, $R_7$, and $R_8$ are independently alkyl; A is —NH— or –O—; p and q are independently an integer from 1 to 6; and wherein the weight average molecular weight of the structured copolymer is from about 20,000 to about 2,000,000 Daltons.

Another aspect of the invention is a method of resolving a reverse emulsion in produced fluid of an oil production system comprising adding a reverse emulsion breaker to a produced fluid of the oil production system in an amount effective for resolving the reverse emulsion, the reverse emulsion breaker comprising a structured copolymer derived from the monomers of Formulae 1, 20, and 3:

Formula 1

Formula 20

Formula 3 wherein $R_1$, $R_2$, and $R_3$ are independently hydrogen or alkyl; $R_4$, $R_5$, $R_6$, $R_7$, and $R_8$ are independently alkyl; p and q are independently an integer from 1 to 6; and wherein the weight average molecular weight of the structured copolymer is from about 20,000 to about 2,000,000 Daltons.

Yet another aspect of the invention is a reverse emulsion breaker comprising a structured copolymer derived from the monomers of Formulae 1, 20, and 3:

Formula 1

Formula 20

Formula 3 wherein $R_1$, $R_2$, and $R_3$ are independently hydrogen or alkyl; $R_4$, $R_5$, $R_6$, $R_7$, and $R_8$ are independently alkyl; p and q are independently an integer from 1 to 6; and wherein the weight average molecular weight of the structured copolymer is from about 20,000 to about 2,000,000 Daltons.

The structured copolymer can further have a weight average molecular weight from about 50,000 to about 2,000,000 Daltons, from about 50,000 to about 1,500,000 Daltons, from about 50,000 to about 1,000,000 Daltons, from about 50,000 to about 800,000 Daltons, from about 100,000 to about 2,000,000 Daltons, from about 100,000 to about 1,500,000 Daltons, from about 100,000 to about 1,000,000 Daltons, from about 100,000 to about 800,000 Daltons, from about 200,000 to about 2,000,000 Daltons, from about 200,000 to about 1,500,000 Daltons, from about 200,000 to about 1,000,000 Daltons, from about 200,000 to about 800,000 Daltons, from about 300,000 to about 2,000,000 Daltons, from about 300,000 to about 1,500,000 Daltons, from about 300,000 to about 1,000,000 Daltons, from about 300,000 to about 800,000 Daltons. Preferably, the structured copolymer has a weight average molecular weight from about 300,000 to about 800,000 Daltons.

The structured copolymer can have a viscosity of from about 200 cP to about 105000 cP, from about 1,000 cP to about 50,000 cP, from about 200 cP to about 20,000 cP, from about 200 cP to about 15,000 cP, from about 200 cP to about 12,000 cP, from about 200 cP to about 11,000 cP, from about 200 cP to about 10,000 cP, or from about 200 cP to about 9,000 cP, at a concentration of from about 5 wt. % to about 95 wt. % in a solvent at room temperature (from about 20° C. to about 25° C.) at a shear speed of 20 rpm. Preferably, the structured copolymer has a viscosity of from about 500 cP to about 5,000 cP, from about 500 cP to about 4,500 cP, from about 500 cP to about 4,000 cP, from about 1,000 cP to about 5,000 cP, from about 1,000 cP to about 4,500 cP, or from about 1,000 cP to about 4,000 cP at room temperature, a shear speed of 20 rpm and a concentration from about 20 wt. % to about 24 wt. %.

The structured copolymer can be prepared in aqueous solution, inverse emulsion, dispersion, or as a dry polymer. Preferably, the structured copolymer can be prepared in aqueous solution.

The structured copolymer can be a branched, hyperbranched, comb, dendrimer, or star polymer.

The structured copolymer can be a random, alternating, tapered, or block copolymer.

Further, the reverse emulsion breaker described herein can be used in a method of resolving a reverse emulsion in produced fluids of an oil production system comprising adding the reverse emulsion breaker to the produced emulsion of the oil production system in an amount effective for resolving the reverse emulsion.

The reverse emulsion can be an oil-in-water emulsion, a water-in-oil-in-water emulsion, or a combination thereof. Particularly, the reverse emulsion can be a water-in-oil-in-water emulsion.

For the structured copolymers described herein, $R_1$, $R_2$, and $R_3$ can independently be hydrogen or methyl. Further, $R_1$ and $R_2$ can be hydrogen and $R_3$ can be methyl. Additionally, $R_1$, $R_2$, and $R_3$ can be hydrogen.

Also, for the structured copolymers described herein, $R_4$, $R_5$, $R_6$, $R_7$, and $R_5$ can independently be methyl, ethyl, propyl, butyl, pentyl, or hexyl. Preferably, $R_4$, $R_5$, $R_6$, $R_7$, and $R_5$ can be methyl.

Further, for the structured copolymers described herein, p and q can be 1 to 3.

For preferred structured copolymers, A is —NH—; $R_1$ and $R_2$ are hydrogen; $R_3$ is methyl; $R_4$, $R_5$, $R_6$, $R_7$, and $R_5$ are methyl, and p is 3.

For Formula 2, A is —NH— when the polymer will be used in fluids at a temperature of up to 180° C. and A is —O— when the polymer will be used in fluids at a temperature of up to 110° C.

Monomers of Formula 3 can be [3-(methacryloylamino)propyl]trimethyl ammonium chloride (MAPTAC), [3-(acryloylamino)propyl]trimethyl ammonium chloride (APTAC), 2-acryloyloxyethyltrimethyl ammonium chloride (AETAC), 2-methacryloyloxyethyltrimethyl ammonium chloride (METAC), diallyldimethyl ammonium chloride (DADMAC), acryloyloxyethyldimethylbenzyl ammonium chloride (AEDBAC), methacryloyloxyethyldimethylbenzyl ammonium chloride (MEDBAC), or a combination thereof. Preferably, the monomer of Formula 3 can be [3-(methacryloylamino)propyl]trimethyl ammonium chloride (MAPTAC), [3-(acryloylamino)propyl]trimethyl ammonium chloride (APTAC), N,N-dimethyl-N.N diallyl ammonium chloride (DADMAC), or a combination thereof.

Monomers of Formulae 2 can be dimethylaminopropyl methacrylamide (DMAPMA), dimethylaminopropyl acrylamide, dimethylaminoethyl methacrylate, dimethylaminopropyl methacrylate, dimethylaminoethyl acrylate, dimethylaminopropyl acrylate, N,N, dimethyl(metha)acrylamide, N,N'-methylene bisacrylamide, poyamidoamines, or polyethylene imines, or a combination thereof.

Monomers of Formula 1 can be acrylamide, methacrylamide, or a combination thereof.

The structured copolymers described herein can comprise from about 50 mole percent to about 97 mole percent, from about 50 mole percent to about 90 mole percent, from about 50 mole percent to about 80 mole percent, from about 50 mole percent to about 75 mole percent, from about 60 mole percent to about 97 mole percent, from about 60 mole percent to about 90 mole percent, from about 60 mole percent to about 80 mole percent, from about 60 mole percent to about 75 mole percent, from about 65 mole percent to about 97 mole percent, from about 65 mole percent to about 90 mole percent, from about 65 mole percent to about 80 mole percent, or from about 65 mole percent to about 75 mole percent, of a repeat unit derived from the monomer of Formula 1 based on the total amount of monomers of Formulae 1, 2, and 3 in the structured copolymer.

The structured copolymers described herein can comprise from about 0.2 mole percent to about 4 mole percent, from about 0.2 mole percent to about 3 mole percent, from about 0.2 mole percent to about 2 mole percent, from about 0.2 mole percent to about 1.5 mole percent, from about 0.5 mole percent to about 4 mole percent, from about 0.5 mole percent to about 3 mole percent, from about 0.5 mole percent to about 2 mole percent, from about 0.5 mole percent to about 1.5, from about 1 mole percent to about 4 mole percent mole percent, from about 1 mole percent to about 3 mole percent, from about 1 mole percent to about 2 mole percent, or from about 1 mole percent to about 1.5 mole percent of a repeat unit derived from the monomer of Formulae 2 or 20 based on the total amount of monomers of Formulae 1, 2, and 3 in the structured copolymer.

The structured copolymers described herein can comprise from about 3 mole percent to about 50 mole percent, from about 3 mole percent to about 40 mole percent, from about 3 mole percent to about 30 mole percent, from about 10 mole percent to about 50 mole percent, from about 10 mole percent to about 40 mole percent, from about 10 mole percent to about 30 mole percent, from about 20 mole percent to about 50 mole percent, from about 20 mole percent to about 40 mole percent, from about 20 mole percent to about 30 mole percent, from about 24 mole percent to about 50 mole percent, from about 24 mole percent to about 40 mole percent, or from about 24 mole percent to about 30 mole percent, of a repeat unit derived from the monomer of Formula 3 based on the total amount of monomers of Formulae 1, 2, and 3 in the structured copolymer.

The structured copolymers described herein can comprise from about 65 mole percent to about 90 mole percent of the repeat unit derived from a monomer of Formula 1, from about 0.5 mole percent to about 2 mole percent of the repeat unit derived from a monomer of Formula 2, and from about 10 mole percent to about 35 mole percent of the repeat unit derived from a monomer of Formula 3 based on the total amount of monomers of Formulae 1, 2, and 3 in the structured copolymer.

Preferably, the structured copolymers are water-soluble.

When the reverse emulsion breaker is used to break an emulsion in an oil production system, the emulsion can be in the produced fluid from a steam-assisted gravity drainage production system, a cyclic steam stimulation system, a cold heavy oil production with sand system, or a conventional heavy oil or extra-heavy oil production system.

Further, when the reverse emulsion breaker is used to break an emulsion in an oil production system, the produced fluid is from a steam-assisted gravity drainage production system.

The effective amount of the reverse emulsion breaker is from about 5 ppm to about 500 ppm, from about 5 ppm to about 450 ppm, from about 5 ppm to about 400 ppm, from about 5 ppm to about 350 ppm, from about 5 ppm to about 300 ppm, from about 5 ppm to about 250 ppm, from about 10 ppm to about 500 ppm, from about 10 ppm to about 450 ppm, from about 10 ppm to about 400 ppm, from about 10 ppm to about 350 ppm, from about 10 ppm to about 300 ppm, or from about 10 ppm to about 250 ppm based on the total volume of the produced fluid.

Preferably, the effective amount of the reverse emulsion breaker is from about 10 ppm to about 250 ppm based on the volume of the produced fluid.

Additionally, when the reverse emulsion breaker is used to break an emulsion in an oil production system, an emulsion breaker and the reverse emulsion breaker can be added to the produced fluid of the oil production system. The emulsion breaker can comprise an oxyalkylated phenol-formaldehyde resin, a resin ester, an oxyalkylated polyalkylamine, a polyol, a cross-linked polyol with a di- or multi-functional cross-linker, an isocyanate, an acid, or a combination thereof. The emulsion breaker comprises a mixture of the reverse emulsion breakers and the emulsion breakers depending on the properties of the particular produced fluid.

In some instances, the emulsion breaker and the reverse emulsion breaker have a synergistic effect for resolving the water-in-oil-in-water emulsion in the produced water of an oil production system.

The emulsion breaker can have a concentration from about 100 ppm to about 400 ppm based on the total volume of the produced fluid.

A diluent can be added to the production system and the diluent can be condensate, naphtha, kerosene, light crude oil, or a combination thereof.

Figure 1:
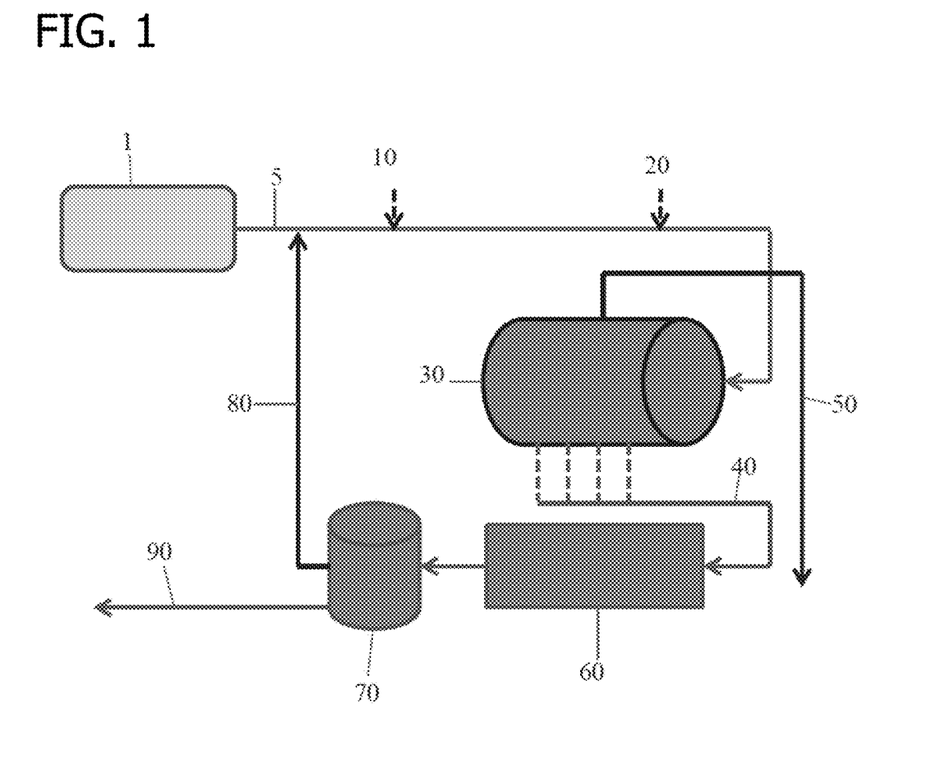
FIG. 1 is a schematic of a separation system to separate solids, oil, and water in an emulsified hydrocarbon fluid.
Figure 2A:
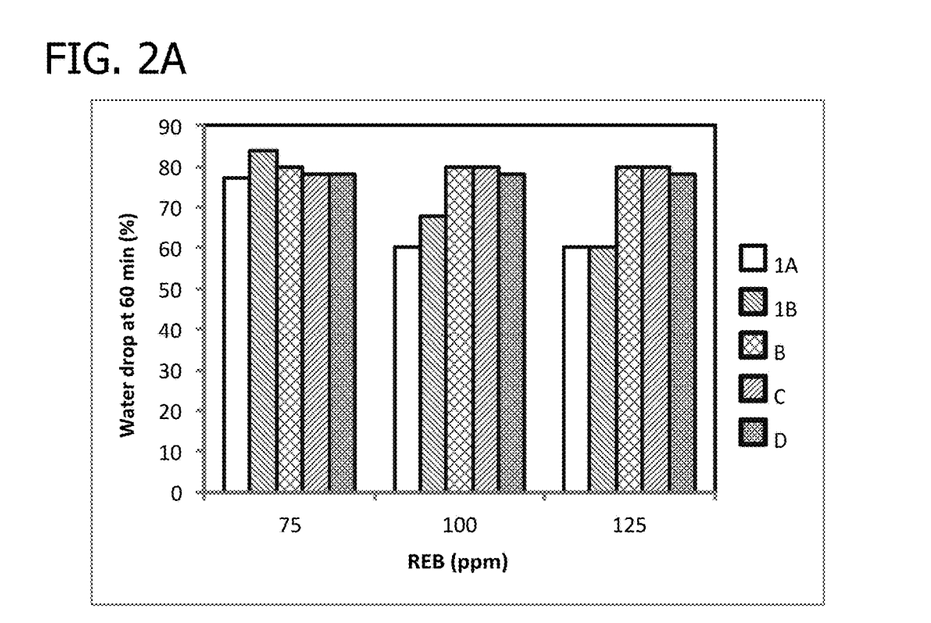
FIGS. 2A to 2C are bar graphs of the water drop (%) at 60 minutes (2A), water quality after 60 minutes (2B), and percent basic sediments and water (BS&W) (2C) as a function of the reverse emulsion breaker (REB) concentration in ppm.
Figure 2B:
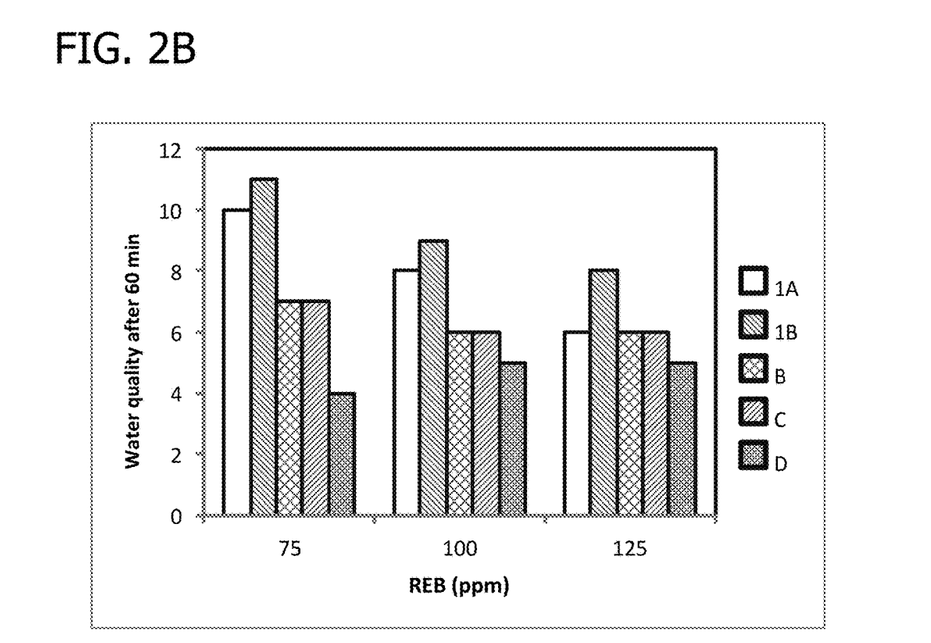
Figure 2C:
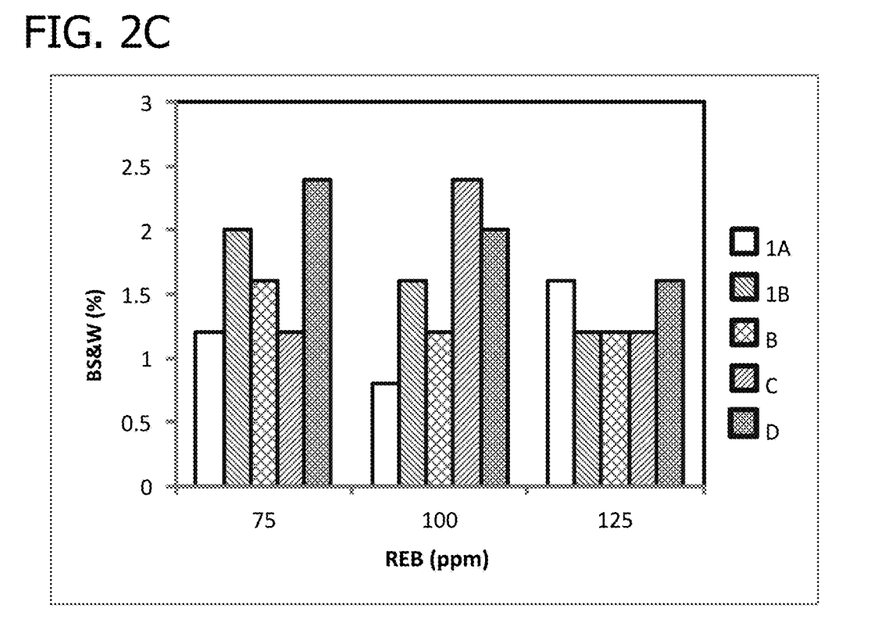
Figure 3A:
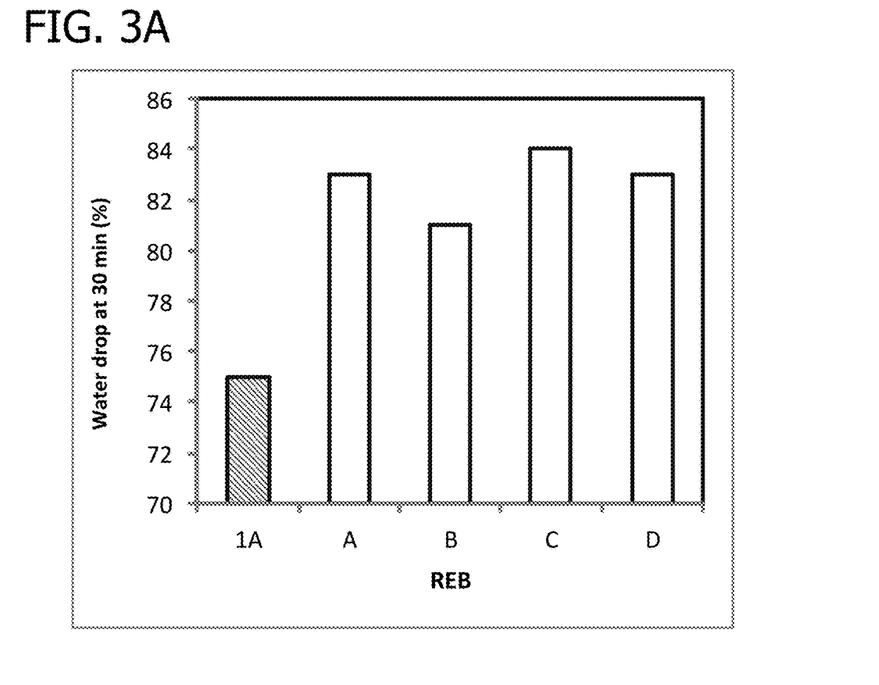
FIGS. 3A to 3C are bar graphs of the water drop (%) at 30 minutes (3A), water quality after 5 minutes (3B), and final percent basic sediments and water (BS&W) (3C) at a REB concentration of 150 ppm.
Figure 3B:
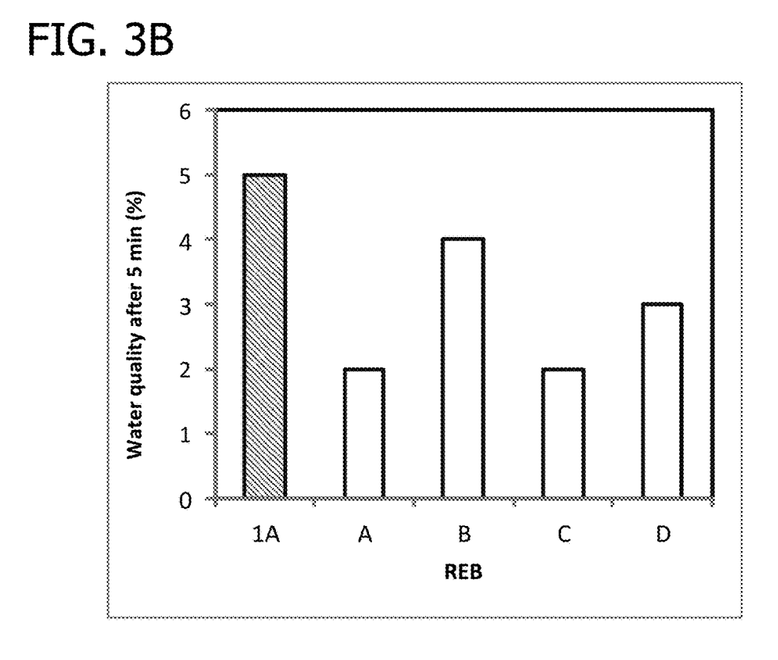
Figure 3C:
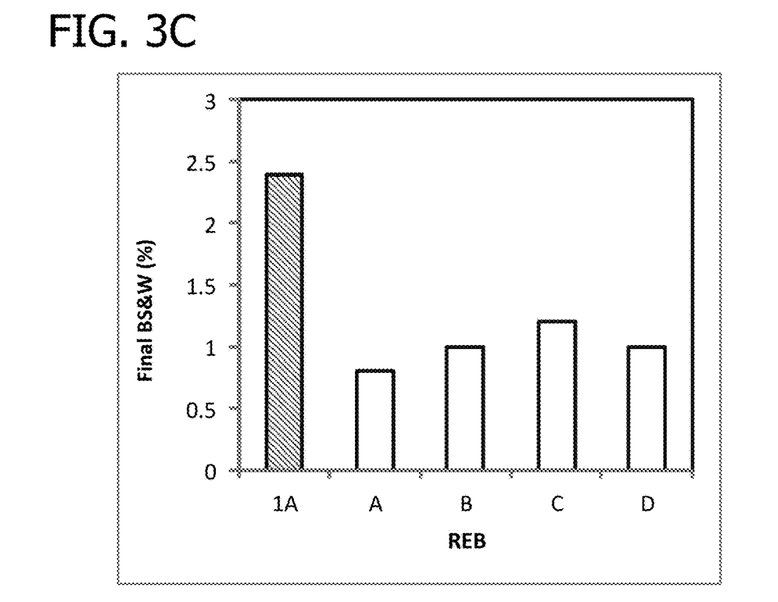

The reverse emulsion breaker copolymers of the present invention are preferably added to the inlet emulsion to a water and oil separating system. The water and oil separating system is depicted in FIG. 1 and comprises a production well 1 that produced a produced fluid carried in a produced fluid line 5. To the produced fluid line 5 can be added an emulsion breaker, a reverse emulsion breaker, or a combination thereof at injection point 10. When the reverse emulsion breaker is combined with the emulsion breaker, they can be injected simultaneously or sequentially. Further, a diluent can be injected at injection point 20. The produced fluid is then sent to one or more separation vessels 30. The separation vessels can be a free water knock out (FWKO) vessel, a heater-treater, or a phase separator. The produced water from the separation vessel(s) is carried in a produced water line 40 to a flotation tank 60. The produced water from the flotation tank 60 is sent to a skim tank 70 where the bottoms are sent to a produced water tank through the produced water tank line 90 and recycled oil is skimmed from the surface of the liquid in the skim tank 70 and sent back to the produced fluid line 5 through the recycled oil line 80. The tops from the separation vessels are sent to the oil tank through the oil line 50.

While FIG. 1 provides an exemplary system, a person of ordinary skill in the art would have known that the reverse emulsion breaker could be added to the system at various points included before chemical injection or before the emulsion breaker.

Preferably, the structured copolymers are prepared by solution polymerization; particularly by radical polymerization in aqueous solution.

The structured copolymer can be prepared by contacting a monomer of Formulae 1, 2, and 3 with a chain transfer agent.

The chain transfer agent can be sodium hypophosphite, isopropanol, a thiol, a mercaptan, formic acid, sodium formate, or a combination thereof.

Generally, preparation of the structured copolymers is carried out in a standard laboratory reactor equipped with a stainless steel stirring assembly, and heating and cooling capability. Deionized water is added to the reactor with nitrogen purge and the temperature is set at 20-30° C. Desired amounts of a monomer of Formula 1, a monomer of Formula 2, and a monomer of Formula 3 are placed in a flask with a monomer inhibitor chelator (e.g., ethylenediaminetetraacetate (EDTA)) and a chain transfer agent (CTA), e.g., sodium hypophosphite. The monomer solution is purged with an inert gas for 15 minutes and placed in a syringe attached to a syringe pump. A mixture of polymerization initiators (e.g., sodium persulfate and ammonium persulfate) dissolved in deionized water is purged with an inert gas and placed in a syringe equipped with a syringe pump. The monomer solution is pumped into the reactor at a rate of 0.5-0.7 mL/minute for 175 minutes. The polymerization initiator solution is pumped at a rate of 2.3-3.0 mL/hour for 180 minutes. After the polymerization initiator solution is dosed, sodium metabisulfite is added to the reactor, the reactor temperature is increased to 40-60° C., and reacted for about 30 minutes. After the reaction, the pH of the solution was adjusted to 7 with a 15% aqueous HCl solution.

The reverse emulsion breaker can be dissolved in a solvent. The solvent can be water, methanol, ethylene glycol, propylene glycol, or a combination thereof. Preferably, the solvent comprises water.

The copolymer characteristics were determined by size-exclusion chromatography/multi-angle laser light scattering (or SEC/MALLS) and dynamic (Brookfield) viscosity techniques. The structured copolymers of this invention exhibit a relatively low solution viscosity due to the introduction of branches by the polymerization method. This provided an increased polymer activity in the final product. An interesting aspect of these structured copolymers is their considerably lower viscosity characteristics in comparison with their linear analogues, which is a consequence of the architecture of the molecules. In fact, linear analogues with similar molecular weights reach comparable viscosity levels at about 10% active as compared to about 20% actives for structured polymers.

The ability of the copolymers to elute from SEC column is indicative of polymer solubility in dilute solution. Polymers structured through too much cross-linking or branching have a tendency to form insoluble fractions, and these fractions do not pass through the SEC column under the elution conditions.

The three-dimensional structure of the copolymers can be determined by a SEC/MALLS technique. Size exclusion chromatography (SEC) was performed by using a series of TSK-GEL PW columns from TOSOH BIOSCIENCE, a multi-angle laser light scattering detector (MALLS, model: DAWN DSP-F) and an interferometric refractometer (OPTI-LAP DSP) from Wyatt Technology. The aqueous mobile phase contained 0.1 molar sodium nitrate, phosphate buffer solution (pH 3) and a small amount of sodium azide. Data collection and analysis were performed with ASTRA software from Wyatt Technology. A 25 Debye model and a third order detector fit method were employed in data analysis.

The efficacy of the reverse emulsion breaker copolymer is determined based on a number of factors such as water drop, water quality, interface quality, oil dryness, and the like.

Emulsion stability is monitored by measuring phase separation at about 90° C. to about 150° C. using bottle testing. The produced emulsion (100 mL) is poured in an appropriate container and heated and/or mixed for approximately 30 to 60 minutes at about 90° C. to about 150° C. In some tests the mixed emulsion is placed back in the water or oil bath at about 90° C. to about 150° C.; in other cases the next step is injection. The reverse emulsion breaker (REB), and emulsion breaker (EB) and are injected at a designated dose, hand-shaken for 100 cycles (or in a shaker at low setting for 1 minute), and placed in the bath at 90° C. or higher for observation of water drop during 60-120 minutes. Basic sediments and water (BS&W) are determined by diluting 6 mL of the oil close to the interface with 6 mL xylene, toluene, or mineral spirits (e.g., Varsol™) and centrifuging for five minutes in a heated centrifuge. Water clarity was ranked on a comparative visual scale from 11 (partially broken reverse) to a 1 (≤50 NTU). A rating of 9 could be deemed equivalent to 1500 NTU, while a rating of 4 or 5 would be equal to about 500 NTU.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The term "structured copolymer" refers to a compact non-linear polymer with controlled branching, the structure of which includes a deviation from linearity in the backbone polymer chain. Preparation of structured copolymers is described herein.

Weight average molecular weight refers to the molecular weight average of a polymer, for example, determined by static light scattering measurement such as a size exclusion chromatography/multi angle laser light scattering (SEC/MALLS) method.

were set up so that monomer and initiator solutions were pumped for 175 minutes and 180 minutes, respectively. The monomer solution was pumped at a rate of 0.5-0.7 mL/minute, while the initiator solution was pumped at a rate of 2.3-3.0 mL/hour. Once the initiator solution was completely dosed, sodium metabisulfite was injected into the reactor, temperature was increased to 50° C. and left react for 30 minutes. The pH of resulting solution was adjusted to 7.0 with a 15% HCl solution.

The structured copolymers were characterized by nuclear magnetic resonance (NMR), gel permeation chromatography (GPC), and viscometry.

Once the polymers were synthesized, methanol or choline chloride was added at different concentrations in order to reduce the freezing point. Then, they were tested as reverse emulsion breakers in laboratory and field bottle tests with produced fluids such as SAGD emulsions, which contained 70-95% of water and 5-30% heavy oil. Concentration was one of the parameters that was changed during the tests to compare the new products with the incumbent agents. Their performance in the presence of different emulsion breakers was also monitored.

The table below details the amounts of each reagent and the properties of the structured copolymers prepared according to this process.

| Sample | Actives (wt. %) | Aam:MAPTAC:DMAPMA (mol) | [APS + SPS] | [NaHypo] | Mw (kDa) | Original Viscosity (cP) |
|---|---|---|---|---|---|---|
| A | 20 | 73.9:24.9:1.2 | 2.81E−02 | 2.55E−03 | 450 | 4371 |
| B | 24 | 73.9:24.9:1.2 | 3.37E−02 | 4.21E−03 | 430 | 8206 |
| C | 24 | 73.9:24.9:1.2 | 3.37E−02 | 5.62E−03 | 360 | 5255 |
| D | 24 | 69.2:29.6:1.2 | 3.17E−02 | 5.28E−03 | 410 | 3215 |

Having described the invention in detail, it will be apparent that modifications and variations are possible without departing from the scope of the invention defined in the appended claims.

EXAMPLES

The following non-limiting examples are provided to further illustrate the present invention.

Example 1: General Procedure for Polymerization

The structured copolymer was prepared by radical polymerization in aqueous solution. Synthesis was carried out in a standard 500 mL laboratory reactor equipped with a stainless steel stirring assembly, and heating and cooling capability. Deionized water was added to the reactor with nitrogen purge and the temperature was set at 30° C. The corresponding amounts of acrylamide (Aam), [3-(methacryloylamino)propyl]trimethyl ammonium chloride (MAPTAC), and dimethylaminopropyl methacrylamide (DMAPMA) were added to a 250 mL three neck round flask together with the ethylene diamine tetraacetate (EDTA) as chelating agent for the monomer inhibitor and sodium hypophosphite (Na Hypo) as chain transfer agent (CTA). The weight percentage of CTA ranged from 0.10% to 1.0% based on the weight of monomers. The monomer solution was purged for 15 minutes with nitrogen gas and placed in a 140 mL syringe attached to a syringe pump. The initiators mixture (sodium persulfate (SPS) and ammonium persulfate (APS)), dissolved in DI water, was added to a 40 mL scintillation flask with a septum, purged for 5 minutes and placed into a 12 mL syringe attached to another syringe pump. Pumping rates Emulsion stability was monitored by measuring phase separation at about 90° C. using conventional bottle testing. The produced emulsion (100 mL) was poured in a 6 ounce prescription glass bottle and heated for approximately 30 to 60 minutes at about 90° C. in a water bath. A diluent was added to the emulsion and mixed using a mechanical shaker at low speed for five minutes or mixed by shaking the bottle by hand. In some tests the mixed emulsion was placed back in the water bath at 90° C. and in other cases the next step was injection of the reverse emulsion breaker and optionally, the emulsion breaker into the emulsion. The flow sheet of the production plant that is being mimicked determines whether the emulsion was placed back into the water bath or if the reverse emulsion breaker, and the emulsion breaker were injected into the emulsion. An emulsion breaker (EB) and a reverse emulsion breaker (REB) was injected by syringe at a designated dose, shook by hand for 100 cycles, and placed in the water bath at 90° C. for observation during 60-120 minutes. Basic sediments and water (BS&W) were determined by diluting 6 mL of the oil close to the interface with 6 mL xylene, toluene, or mineral spirits (e.g., Varsol™) and centrifuging for five minutes. Water clarity was ranked on a comparative visual scale from 11 (partially broken reverse) to a 1 (≤50 NTU). A rating of 9 could be deemed equivalent to 1500 NTU, while a rating of 4 or 5 would be equal to about 500 NTU. A water quality of 1 is very good and a water quality of 12 very poor.

Reverse emulsion breakers 1A and 1B are incumbent products.

Bottle testing results using 350 ppm of emulsion breaker at Location 1

| Sample | REB ppm | Water Drop (%) | | | | Water Quality 5 min | Water Quality 60 min | Centrifuge Data | | |
|---|---|---|---|---|---|---|---|---|---|---|
| | | 5 min | 15 min | 30 min | 60 min | | | W % | BS % | BS&W % |
| 1A | 75 | 55 | 73 | 73 | 77 | 10 | 10 | 0.7 | 0.5 | 1.2 |
| 1B | 75 | 60 | 80 | 84 | 84 | 12 | 11 | 1.2 | 0.8 | 2 |
| B | 75 | 45 | 68 | 72 | 80 | 8 | 7 | 1.2 | 0.4 | 1.6 |
| C | 75 | 43 | 60 | 72 | 78 | 8 | 7 | 1 | 0.2 | 1.2 |
| D | 75 | 53 | 65 | 70 | 78 | 5 | 4 | 1.8 | 0.6 | 2.4 |
| 1A | 100 | 30 | 45 | 53 | 60 | 8 | 8 | 0.2 | 0.6 | 0.8 |
| 1B | 100 | 45 | 65 | 65 | 68 | 9 | 9 | 0.6 | 1.0 | 1.6 |
| B | 100 | 45 | 68 | 73 | 80 | 7 | 6 | 1 | 0.2 | 1.2 |
| C | 100 | 43 | 62 | 72 | 80 | 7 | 6 | 1.6 | 0.8 | 2.4 |
| D | 100 | 57 | 70 | 72 | 78 | 6 | 5 | 1.6 | 0.4 | 2 |
| 1A | 125 | 35 | 50 | 53 | 60 | 6 | 6 | 0.4 | 1.2 | 1.6 |
| 1B | 125 | 35 | 53 | 55 | 60 | 8 | 8 | 0.4 | 0.8 | 1.2 |
| B | 125 | 45 | 62 | 72 | 80 | 7 | 6 | 1 | 0.2 | 1.2 |
| C | 125 | 43 | 70 | 74 | 80 | 6 | 6 | 1 | 0.2 | 1.2 |
| D | 125 | 40 | 63 | 74 | 78 | 8 | 5 | 1.2 | 0.4 | 1.6 |

Bottle testing results using 250 ppm of emulsion breaker 20 at Location 2

| | | Free water knockout simulation | | | | | | | Treaters simulation | | | | | | |
|---|---|---|---|---|---|---|---|---|---|---|---|---|---|---|---|
| | | Water drop (%) | | | Water quality 5 min | W % | BS % | BS&W % | Water drop (%) | | | | W % | BS % | BS&W % |
| | Conc ppm | 5 min | 15 min | 30 min | | | | | 15 min | 30 min | 90 min | 180 min | | | |
| 1A | 105 | 40 | 60 | 60 | 10 | 0.4 | 16.6 | 17 | 65 | 65 | 65 | 74 | 0 | 1.6 | 1.6 |
| A | 105 | 80 | 82 | 84 | 5 | 0.2 | 3.8 | 4 | 86 | 87 | 87 | 88 | 0.1 | 1.1 | 1.2 |
| B | 105 | rev | rev | rev | 11 | — | — | — | — | — | — | — | — | — | — |
| C | 105 | 82 | 82 | 81 | 3 | 0.2 | 4.2 | 4.4 | 81 | 84 | 87 | 87 | 0 | 0.8 | 0.8 |
| D | 105 | rev | rev | rev | 11 | — | — | — | — | — | — | — | — | — | — |
| 1A | 150 | 75 | 75 | 75 | 5 | 0 | 14.0 | 14 | 80 | 81 | 82 | 82 | 0.2 | 2.2 | 2.4 |
| A | 150 | 80 | 80 | 83 | 2 | 0 | 4.2 | 4.2 | 83 | 83 | 83 | 85 | 0 | 0.8 | 0.8 |
| B | 150 | 79 | 80 | 81 | 4 | 0.1 | 4.1 | 4.2 | 82 | 83 | 83 | 83 | 0 | 1.0 | 1 |
| C | 150 | 82 | 83 | 84 | 2 | 0.2 | 5.0 | 5.2 | 82 | 86 | 86 | 87 | 0 | 1.2 | 1.2 |
| D | 150 | 80 | 81 | 83 | 3 | 0.2 | 5.4 | 5.6 | 84 | 83 | 85 | 85 | 0 | 1.0 | 1 |

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

What is claimed is:

1. A method of resolving a reverse emulsion in produced fluid of an oil production system comprising adding a reverse emulsion breaker to a produced fluid of the oil production system in an amount effective for resolving the reverse emulsion, the reverse emulsion breaker comprising a structured copolymer derived from the monomers of Formulae 1, 2, and 3:

Formula 1

Formula 2

Formula 3 wherein
$R_1$, $R_2$, and $R_3$ are independently hydrogen or alkyl;
$R_4$, $R_5$, $R_6$, $R_7$, and $R_8$ are independently alkyl;
A is independently —NH— or —O—;
p and q are independently an integer from 1 to 6; and
the weight average molecular weight of the structured copolymer is from about 20,000 to about 2,000,000 Daltons.

2. The method of claim 1 wherein A is —NH—.

3. The method of claim 2 wherein the weight average molecular weight is from about 100,000 to about 850,000 Daltons.

4. The method of claim 1 wherein the structured copolymer has a viscosity of about 200 cP to about 105000 cP at a concentration of from about 5 wt. % to about 95 wt. % in a solvent.

5. The method of claim 4 where the copolymer has the viscosity of about 500 cP to 5,000 cP.

6. The method of claim 1 wherein the copolymer is prepared in aqueous solution, inverse emulsion, dispersion, or as a dry polymer.

7. The method of claim 6, wherein the structured copolymer is prepared in aqueous solution.

8. The method of claim 1 wherein the structured copolymer is a branched, hyperbranched, comb, dendrimer, or star polymer.

9. The method of claim 1 wherein the reverse emulsion is an oil-in-water emulsion, a water-in-oil-in-water emulsion, or a combination thereof.

10. The method of claim 9 wherein the reverse emulsion is a water-in-oil-in-water emulsion.

11. The method of claim 10 wherein $R_1$, $R_2$, and $R_3$ are independently hydrogen or methyl.

12. The method of claim 11 wherein $R_1$ is hydrogen, $R_2$ is hydrogen, and $R_3$ is methyl.

13. The method of claim 12 wherein $R_4$, $R_5$, $R_6$, $R_7$, and $R_8$ are independently methyl, ethyl, propyl, butyl, pentyl, or hexyl.

14. The method of claim 13 wherein $R_4$, $R_5$, $R_6$, $R_7$, and $R_8$ are methyl.

15. The method of claim 14 wherein q and p are independently 1 to 3.

16. The method of claim 1 wherein $R_1$ and $R_2$ are hydrogen; $R_3$ is methyl; $R_4$, $R_5$, $R_6$, $R_7$, and $R_8$ are methyl, and p and q are 2 or 3.

17. The method of claim 1 wherein the reverse emulsion breaker is water-soluble.

18. The method of claim 1, wherein the produced fluid is from a steam-assisted gravity drainage production system.

19. The method of claim 1 wherein the effective amount of the reverse emulsion breaker is from about 10 ppm to about 250 ppm based on the total volume of the produced fluid.

20. The method of claim 1 wherein the structured copolymer comprises from about 65 mole percent to about 90 mole percent of the repeat units derived from the monomer of Formula 1, the structured copolymer comprises from about 0.5 mole percent to about 2 mole percent of the repeat units derived from the monomer of Formula 2, and the structured copolymer comprises from about 10 mole percent to about 35 mole percent of the repeat units derived from the monomer of Formula 3 in the structured copolymer.

* * * * *